Nov. 6, 1956 J. R. OISHEI 2,769,194
WINDSHIELD CLEARING SYSTEM
Filed Sept. 30, 1953 2 Sheets-Sheet 1

INVENTOR.
John R. Oishei
BY
Bean, Brooks, Buckley & Bean
Attys.

Nov. 6, 1956 J. R. OISHEI 2,769,194
WINDSHIELD CLEARING SYSTEM
Filed Sept. 30, 1953 2 Sheets-Sheet 2

INVENTOR.
John R. Oishei
BY
Bean, Brooks, Buckley & Bean
Attys.

United States Patent Office 2,769,194
Patented Nov. 6, 1956

2,769,194

WINDSHIELD CLEARING SYSTEM

John R. Oishei, Buffalo, N. Y., assignor to Trico Products Corporation, Buffalo, N. Y.

Application September 30, 1953, Serial No. 383,155

16 Claims. (Cl. 15—250.4)

This invention relates to windshield cleaners of the type employed in automotive vehicles, and more particularly to a system for coordinating the operations of the windshield wiper and washer.

Heretofore, a plurality of manual operations were required to institute and complete the windshield washing cycle, specifically, commencing the operation of the washer, starting the wipers, shutting off the washer and stopping the wipers. Apart from the inconvenience to the operator of the vehicle resulting from the manipulation of the various controls, a distinct driving hazard exists due to the distraction of the operator's attention from the road during the washing cycle. The need for a system whereby the washing cycle may be carried out with a minimum amount of attention from the operator is obvious.

Accordingly, it is the primary object of this invention to provide a system whereby a minimum number of manual operations will be required to institute and complete the washing cycle.

For a better understanding of this and other objects of the invention, reference is made to the following specifications and accompanying drawings wherein.

Figure 1:
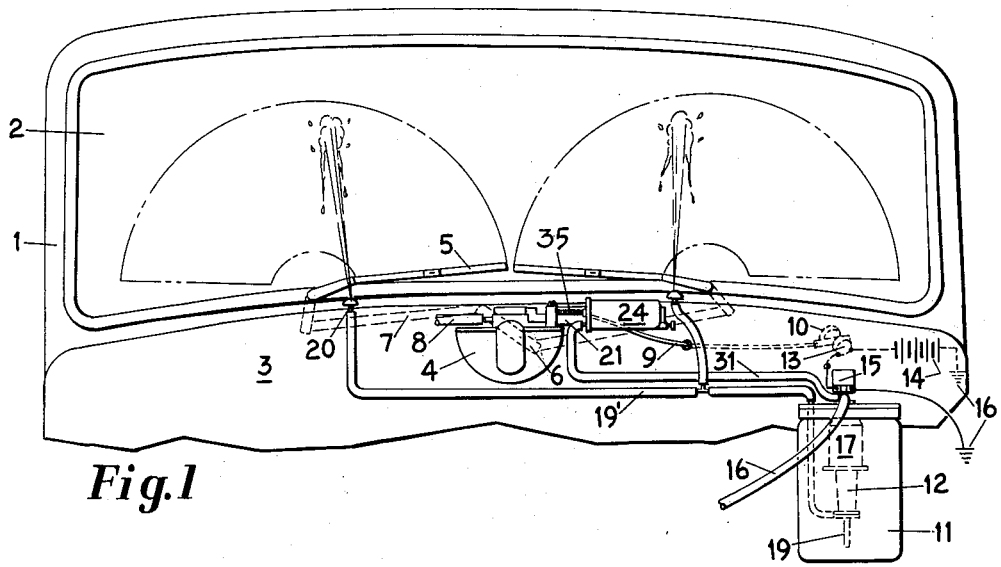
Fig. 1 is a fragmentary view of an automotive vehicle equipped with a windshield cleaner constructed in accordance with the present invention.

Referring now more particularly to the drawings, the numeral 1 designates an automotive vehicle having a windshield 2 and a firewall 3. Wiper motor 4 which may be of the conventional fluid pressure type is mounted on the firewall and connected to the wipers 5 via rocker arm 6 and connecting rods 7. Conduit 8 leads from the motor to a suitable source of suction such as the intake manifold of the vehicle's power plant, not shown, while Bowden cable 9 is utilized to transmit motion from control knob 10 located on the instrument panel to the throttle valve 11' which controls the operation of the motor. When the motor control means, i. e. the valve, is moved to the "on" position the pressure chamber of the motor is placed in communication with the intake manifold, and if the power plant is in operation, the vacuum existent in the manifold creates a pressure differential within the pressure chamber of the wiper motor, setting the latter in operation.

Reservoir 11 of the washer is mounted on the firewall and pump 12 of the plunger type is located therein. Depression of the control button located within knob 10 closes switch 13, completing a circuit from battery 14, through switch 13, solenoid 15, ground 16 and back to the battery. Activation of the solenoid results in the intercommunication of the intake manifold and the pump via conduit 16 and the creation of a vacuum in the upper chamber 17 of the pump. The vacuum causes the plunger, not shown, to rise against the resistance of spring 18, best seen in Fig. 6, sucking fluid into the pump from reservoir 11 via hose 19. When the plunger reaches the top of the pump, it trips a valve which closes off the passage to the manifold and opens chamber 17 to the atmosphere. The vacuum is thereby destroyed, and the plunger moves downward under the urging of spring 18, forcing the fluid into conduit 19' and thence to nozzles 20 from where it is directed toward the windshield.

For a more detailed description of the operation of the windshield wiper and washer, reference may be had to Patent No. 2,743,473 issued to John R. Oishei on May 1, 1956 for a combined Windshield Cleaner and Wiper.

Figure 4:
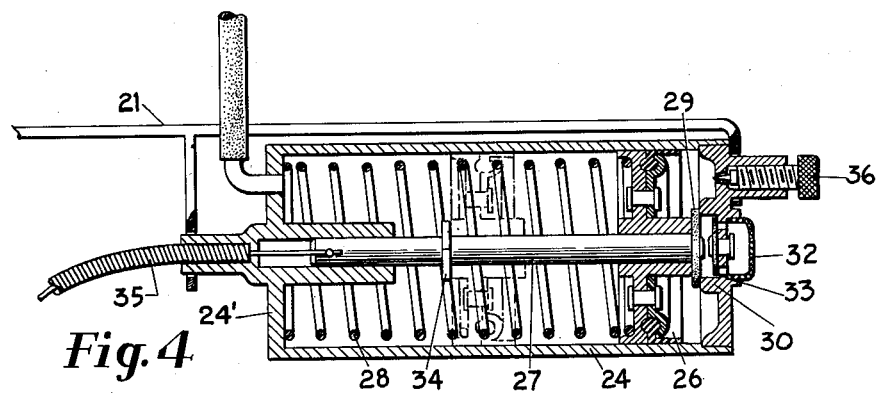
Fig. 4 is a sectional view of the coordinator.
Figure 5:
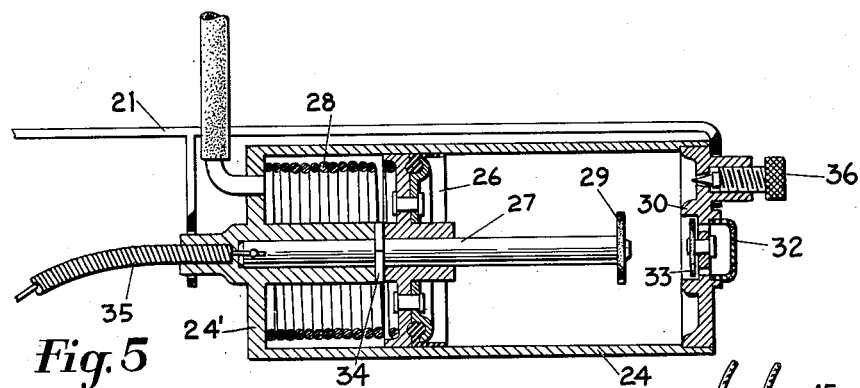
Fig. 5 is a view similar to Fig. 4, but showing the elements of the coordinator in a different position; and, Fig. 6 is a fragmentary view, partly in section showing the manner in which the coordinator is connected to the washer pump.
Figure 6:
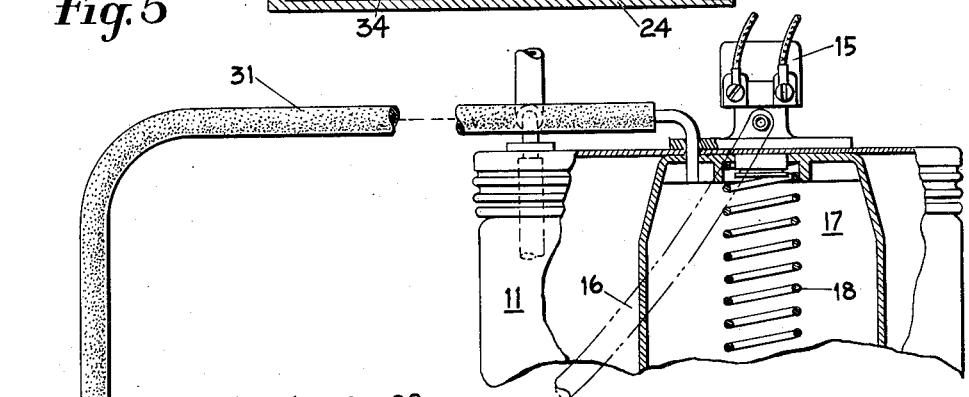

Bracket 21 is fastened to post 22 of the wiper motor and held firmly in place by screw 23. Coordinator cylinder 24 is slidably mounted on the bracket as is best seen in Figs. 4–6. Piston 26 is slidably mounted upon rod 27, the latter being located interiorly of cylinder 24. Spring 28 concentric with the rod is interposed between end wall 24' and piston 26, urging the latter into engagement with shoulder 29 of the rod, and forcing the shoulder against boss 30 of the cylinder. Conduit 31 interconnects the cylinder and chamber 17 of the pump as illustrated in Fig. 6. When the washer is activated, the vacuum existent in chamber 17 causes a similar vacuum to arise in the cylinder, resulting in the creation of a pressure differential across the piston since atmosphere pressure is maintained to the right of the piston through the admission of air into the cylinder via filter screen 32 and check valve 33. As a result of the pressure differential thereacross, the piston moves along the rod against the resistance of spring 28 from the position illustrated in solid in Fig. 4 until it abuts shoulder 34 centrally located on rod 27, as shown in phantom in Fig. 4. Thereafter the rod is carried along with the piston, transmitting its motion to Bowden cable 35 which interconnects the rod and throttle valve 11' of the wiper motor. So long as a vacuum is existent in the pump, the piston and rod will be held in the position illustrated in Fig. 5. The travel of the rod is sufficient to move the throttle valve to its "on" position via cable 35, setting the wipers in operation approximately simultaneously with the commencement of operation of the washer. When the vacuum in the pump is disrupted by the plunger reaching the top of its travel, the vacuum in the cylinder is concurrently destroyed and piston 26 commences to return to its initial position under the urging of spring 28. Needle valve 36 is so adjusted that the time required for the piston to move from its position contiguous to shoulder 34 into engagement with shoulder 29, as shown in Fig. 6, is equal to that period during which fluid is being ejected from the pump onto the windshield. Rod 27 is then carried along with the piston until they return to the position illustrated in Fig. 4, moving throttle valve 11' to its "off" position, causing the wiper to stop. However, as this return movement of the rod does not commence until after the pump has ceased operating, a predetermined number of strokes of the wiper occur after the fluid has stopped impinging upon the windshield. This insures the windshield being wiped dry at the completion of the cleaning cycle.

Figure 2:
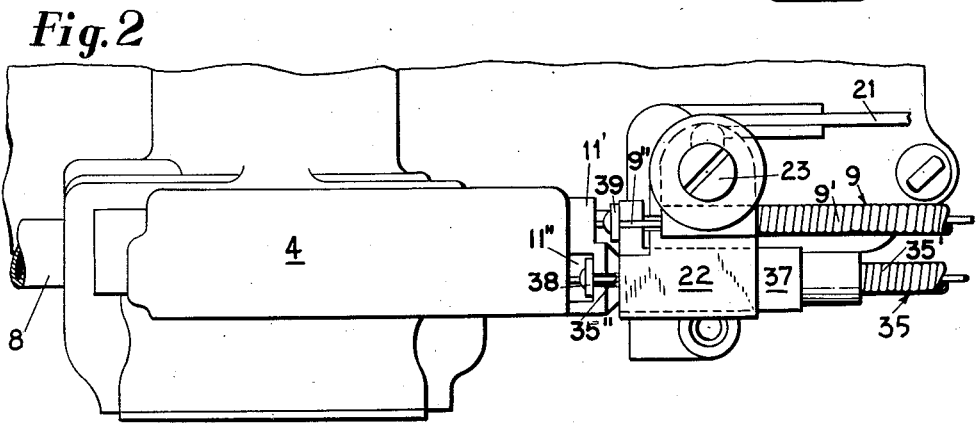
Fig. 2 is a fragmentary plan view of the wiper motor showing the mechanism employed to actuate the throttle valve.
Figure 3:
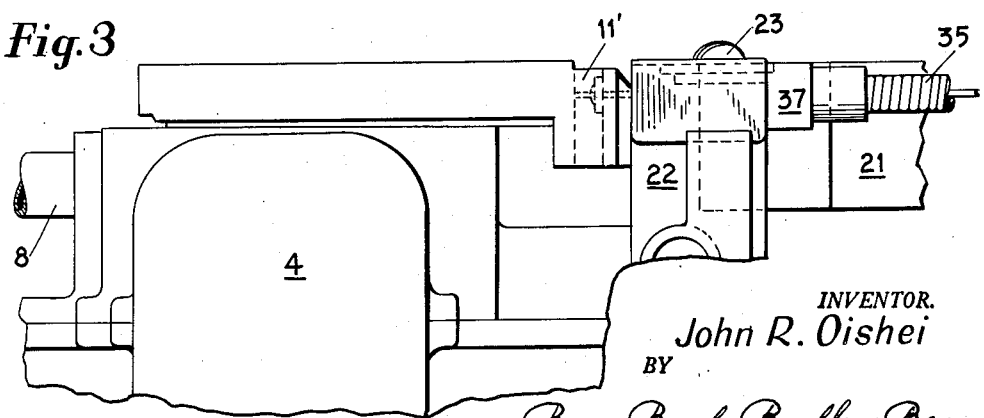
Fig. 3 is a fragmentary elevational view of that portion of the motor illustrated in Fig. 2.

An inspection of Figs. 2 and 3 will indicate that the armor element 35' of the Bowden cable 35 is rigidly attached to L-shaped carrier element 37 while the wire element 35" is connected to the throttle valve 11' as by engaging the head 38 in the recess 11". Bowden cable 9 has its armor element 9' anchored beneath the screw 23 and its wire element 9" slidably connected to element 37 and abutting the valve 11'. When the wiper motor is turned on manually, cable 9 pushes the valve to the left, and the valve in turn pulls cable 35 along with it. As the opposite end of cable 35 is connected to rod 27, the entire coordinator is pulled to the left, sliding along bracket 21; the motion being transmitted from the rod to cylinder 24 via piston 26 and spring 28. When it is desired to manually turn off the wiper, cable 9 pulls element 37, and therefore cable 35 to the right. Cable 35 in turn pulls valve 11' to its "off" position and simultaneously returns the coordinator to its original position.

If the vehicle is being employed in weather which is somewhat inclement, the wipers may be utilized at a low rate of oscillation, by permitting motor 4 to operate in partially throttled condition. This condition is achieved by moving valve 11' only part way to the left. Movement of the valve is accompanied by an equivalent movement of the entire coordinator mechanism via cable 35. If it is subsequently desired to utilize the washer, the operator merely depresses the control button and the cycle described above will be carried out. However, as the entire coordinator mechanism had previously been moved to the left, return of the piston to the position illustrated in Fig. 4 results in returning the throttle valve to its previous manually set position, rather than to the "off" position which would be the case if the coordinator had not been moved.

It may therefore be seen that by utilizing the present invention, it is possible to institute and carry out a complete windshield cleaning cycle with only one manual operation. Further, when the cycle is completed, the throttle valve of the wiper motor will be returned to the position in which it was set prior to the institution of the cleaning cycle, regardless of whether the setting was "full on", "full off" or some intermediate position. There is no need to manually readjust the wiper to its previous operating condition, as such operation is carried out automatically.

Having thus disclosed an exemplary embodiment thereof, what I claim as my invention is:

1. A windshield clearing system for automotive vehicles comprising, means to deliver washing fluid under pressure to the windshield, a coordinator unit, means operatively connecting said fluid delivery means and said coordinator unit whereby the commencement of operation of said fluid delivery means automatically actuates said coordinator unit, a motor for driving a wiper to and fro across the windshield, control means for said motor, said coordinator being connected to the control means for starting the motor, and a lost motion connection between said coordinator unit and control means whereby said control means are moved by said lost motion connection a predetermined length of time after the actuation of said coordinator unit.

2. A windshield clearing system for automotive vehicles comprising, means to deliver washing fluid under pressure to the windshield, a chamber having a rod therein, a fluid dispensing member mounted on said rod, said mounting permitting a limited amount of relative movement between said member and rod, means operatively connecting said fluid delivery means and said chamber whereby said member is caused to travel axially of the rod across the chamber when said fluid delivery means commences operation, said rod moving with said member after the above mentioned relative movement between said rod and member has occurred, a motor for driving a wiper to and fro across the windshield, a throttle valve for said motor, and means operatively connecting said throttle valve and rod so that movement of the rod will cause motor controlling movement of the valve.

3. A windshield clearing system for automotive vehicles comprising, a vacuum activated pump for delivering washing fluid under pressure to the windshield, a cylinder having a rod therein, a piston mounted on said rod, said mounting permitting a limited amount of relative movement between said piston and rod, a spring concentric with said rod and abutting said piston, means operatively connecting said pump and cylinder whereby said piston is caused to travel axially across the cylinder against the resistance of said spring whenever a vacuum is existent in said pump and return to the initial position under the urging of the spring when the vacuum is dissipated, said rod moving with said piston after the above mentioned relative movement between said rod and piston has occurred, a motor for driving a wiper to and fro across the windshield, a throttle valve for said motor, and means operatively connecting said throttle valve and rod so that movement of the rod will cause a similar movement of the valve.

4. A windshield clearing system for automotive vehicles comprising, a vacuum activated pump for delivering washing fluid under pressure to the windshield, a cylinder having a rod therein, a piston mounted on said rod, said mounting permitting a limited amount of relative movement between said piston and rod, a spring concentric with said rod and abutting said piston, means operatively connecting said pump and cylinder whereby said piston is caused to travel axially across the cylinder against the resistance of said spring whenever a vacuum is existent in said pump and return to its initial position under the urging of the spring when the vacuum is dissipated, said rod moving with said piston after the above mentioned relative movement between said rod and piston has occurred, means for controlling the rate of which the piston returns to its initial position, a motor for driving a wiper to and fro across the windshield, a throttle valve for said motor, and means operatively connecting said throttle valve and rod so that movement of the rod will cause a similar movement of the valve.

5. A windshield clearing system for automotive vehicles comprising a vacuum activated pump for delivering washing fluid under pressure to the windshield, a cylinder having a rod therein, a piston mounted on said rod, said mounting permitting a limited amount of relative movement between said piston and rod, means operatively connecting said pump and cylinder whereby said piston is caused to travel axially across the cylinder whenever a vacuum is existent in said pump, said piston returning to its initial position when the vacuum in the pump is dissipated, said rod moving with said piston after the above mentioned relative movement between said rod and piston has occurred, means for controlling the rate at which the piston returns to its initial position, a motor for driving a wiper to and fro across the windshield, a throttle valve for said motor, and means operatively connecting said throttle valve and rod so that movement of the rod will cause a similar movement of the valve.

6. A windshield clearing system for automotive vehicles comprising, means to deliver washing fluid under pressure to the windshield, a cylinder having a rod therein, a piston mounted on said rod, said mounting permitting a limited amount of relative movement between said piston and rod, means operatively connecting said fluid delivery means and said cylinder whereby said piston is caused to travel axially across the cylinder when said fluid delivery means commences operation, said rod moving with said piston after the above mentioned relative movement between said rod and piston has occurred, a motor for driving a wiper to and fro across the windshield, a throttle valve for said motor, manually operable means for adjusting the position of said throttle valve, and means operatively connecting said throttle valve and rod so that movement of one will cause a similar movement of the other.

7. A windshield clearing system for automotive vehicles comprising, a vacuum activated pump for delivering washing fluid under pressure to the windshield, a cylinder having a rod therein, a piston mounted on said rod, said mounting permitting a limited amount of relative movement between said piston and rod, a spring concentric with said rod and abutting said piston, means operatively connecting said pump and cylinder whereby said piston is caused to travel axially across the cylinder against the resistance of said spring whenever a vacuum is existent in said pump and return to its initial position under the urging of the spring when the vacuum is dissipated, said rod moving with said piston after the above mentioned relative movement between said rod and piston has occurred, a motor for driving a wiper to and fro across the windshield, a throttle valve for said motor, manually operable means for adjusting the position of said throttle valve, and means operatively connecting said throttle valve and rod so that movement of one will cause a similar movement of the other.

8. A windshield clearing system for automotive vehicles comprising, a vacuum activated pump for delivering washing fluid under pressure to the windshield, a cylinder having a rod therein, a piston mounted on said rod, said mounting permitting a limited amount of relative movement between said piston and rod, a spring concentric with said rod and abutting said piston, means operatively connecting said pump and cylinder whereby said piston is caused to travel axially across the cylinder against the resistance of said spring whenever a vacuum is existent in said pump and return to its initial position under the urging of the spring when the vacuum is dissipated, said rod moving with said piston after the above mentioned relative movement between said rod and piston has occurred, means for controlling the rate at which the piston returns to its initial position, a motor for driving a wiper to and fro across the windshield, a throttle valve for said motor, manually operable means for adjusting the position of said throttle valve, and means operatively connecting said throttle valve and rod so that movement of one will cause a similar movement of the other.

9. A windshield clearing system for automotive vehicles comprising, a vacuum activated pump for delivering washing fluid under pressure to the windshield, a cylinder having a rod therein, a piston mounted on said rod, said mounting permitting a limited amount of relative movement between said piston and rod, means operatively connecting said pump and cylinder whereby said piston is caused to travel axially across the cylinder whenever a vacuum is existent in said pump, said piston returning to its initial position when the vacuum in the pump is dissipated, said rod moving with said piston after the above mentioned relative movement between said rod and piston has occurred, means for controlling the rate at which the piston returns to its initial position, a motor for driving a wiper to and fro across the windshield, a throttle valve for said motor, manually operable means for adjusting the position of said throttle valve, and means operatively connecting said throttle valve and rod so that movement of one will cause a similar movement of the other.

10. A windshield clearing system for automotive vehicles comprising, a vacuum activated pump for delivering washing fluid under pressure to the windshield, a bracket, a cylinder having an endwall slidably mounted on said bracket, a rod within said cylinder, a piston mounted on said rod, said mounting permitting a limited amount of relative movement between said piston and rod, a spring concentric with said rod interposed between said piston and end wall of said cylinder, means operatively connecting said pump and cylinder whereby said piston is caused to travel axially across the cylinder against the resistance of said spring whenever a vacuum is existent in said pump and return to its initial position under the urging of the spring when the vacuum is dissipated, said rod moving with said piston after the above mentioned relative movement between said rod and piston has occurred, a motor for driving a wiper to and fro across the windshield, a throttle valve for said motor, manually operable means for adjusting the position of said throttle valve, and means operatively connecting said throttle valve and rod so that movement of one will cause a correspondent movement of the other, the valve initiated movement of the rod resulting in a similar movement of the cylinder along the bracket, said movement being transmitted from the rod to the cylinder via the piston and spring.

11. A windshield clearing system for automotive vehicles comprising, a vacuum activated pump for delivering washing fluid under pressure to the windshield, a bracket, a cylinder having an endwall slidably mounted on said bracket, a rod within said cylinder, a piston mounted on said rod, said mounting permitting a limited amount of relative movement between said piston and rod, a spring concentric with said rod interposed between said piston and endwall of said cylinder, means operatively connecting said pump and cylinder whereby said piston is caused to travel axially across the cylinder against the resistance of said spring whenever a vacuum is existent in said pump and return to its initial position under the urging of said spring when the vacuum is dissipated, said rod moving with said piston after the above mentioned relative movement between said rod and piston has occurred, means for controlling the rate at which the piston returns to its initial position, a motor for driving a wiper to and fro across the windshield, a throttle valve for said motor, manually operable means for adjusting the position of said throttle valve, and means operatively connecting said throttle valve and rod so that movement of one will cause a correspondent movement of the other, the valve initiated movement of the rod resulting in a similar movement of the cylinder along the bracket, said movement being transmitted from the rod to the cylinder via the piston and spring.

12. In a coordinated windshield cleaner and washer system, a wiper unit having a control movable from a parked position to intermediate and full running positions, a washer unit having a control, an actuator for the wiper control responsive to the washer control and operable during the washing cycle to move the wiper control to its full running position, resilient means acting through said actuator to restore the wiper control to its parked position following the washing cycle, time delay means operable to regulate the restoring action of said resilient means on said actuator, a manual actuator detachably engaging the wiper control to render the wiper unit operative and presettable to an intermediate running position, said first actuator being operable to move the wiper control from such intermediate position to its full running position for the washing cycle, said resilient means acting to restore the first actuator to the preset intermediate position as determined by said manual actuator for resuming its preset wiper operation.

13. A coordinated windshield cleaner and washer system comprising a wiper unit having a wiper and a motor for driving it, said motor having a control, a washer unit having a pump and an actuator for driving it for a predetermined time interval, said pump motor having a control, a coordinating motor having power line connection to the washer unit to be responsive thereto for energizing the wiper unit to give conjoint action of the two units, resilient means acting to move the wiper control for arresting the wiper unit, and adjustable means cooperating with the resilient means to delay the functioning of the latter for controllably continuing the wiper action beyond the washing cycle for a given interval.

14. A coordinated windshield cleaner and washer system according to claim 13, wherein a manual actuator is detachably connected to the wiper control to free the latter when the coordinating motor responds to washer operation, said manual actuator operable to set the wiper unit in operation for continued use.

15. A coordinated windshield cleaner and washer system according to claim 14, wherein the coordinating motor is slidably supported for bodily movement with the manual actuator and is connected to the latter for establishing a driving connection between the manual actuator and the wiper control for returning the latter to its wiper arresting position.

16. A coordinated windshield cleaner and washer system comprising a wiper unit having a wiper and a motor for driving it, said motor having a slidable control provided with a recess, a washer unit having a pump and an operator for operating the latter for a predetermined time interval, a coordinating means responsive to said washer operator and having a push-pull member engaged in the recess of the wiper control to energize the wiper unit for conjoint action of both units, resilient means acting through said coordinating means to arrest the wiper unit, and a manual actuator detachably connected to the wiper control to normally free the latter for such responsive action by the coordinating means.

References Cited in the file of this patent

UNITED STATES PATENTS

| | | |
|---|---|---|
| 2,162,985 | West | June 20, 1939 |
| 2,323,470 | Horton et al. | July 6, 1943 |
| 2,617,136 | Rappl | Nov. 11, 1952 |